United States Patent [19]
O'Meara

[11] Patent Number: 6,007,219
[45] Date of Patent: Dec. 28, 1999

[54] LASER LIGHTING SYSTEM

[76] Inventor: James C. O'Meara, 3811 W. 72nd Ct., Anchorage, Ak. 99502

[21] Appl. No.: 09/149,180

[22] Filed: Sep. 8, 1998

Related U.S. Application Data

[63] Continuation-in-part of application No. 08/992,584, Dec. 17, 1997, abandoned.

[51] Int. Cl.[6] .............................. F21V 33/00; F21L 7/00
[52] U.S. Cl. ........................................ 362/259; 362/157
[58] Field of Search .................... 362/259, 253, 362/119, 269, 271, 279, 321, 329, 157

[56] References Cited

U.S. PATENT DOCUMENTS

| | | | |
|---|---|---|---|
| 2,549,860 | 4/1951 | Swanson | 250/330 |
| 2,596,603 | 5/1952 | Sands, Jr. | 340/955 |
| 2,602,850 | 7/1952 | Cline | 340/951 |
| 3,134,959 | 5/1964 | Calvert et al. | 340/955 |
| 3,279,406 | 10/1966 | Ricketts et al. | 340/955 |
| 3,599,143 | 8/1971 | Brown et al. | 340/958 |
| 3,710,098 | 1/1973 | Walden | 240/49 |
| 3,866,032 | 2/1975 | Veres | 362/259 |
| 4,161,770 | 7/1979 | Maurer | 362/309 |
| 4,185,891 | 1/1980 | Kaestner | 350/167 |
| 4,291,294 | 9/1981 | Chase | 340/951 |
| 4,408,266 | 10/1983 | Sclippa | 362/62 |
| 4,554,543 | 11/1985 | Wyatt et al. | 340/948 |
| 4,554,544 | 11/1985 | Task | 362/62 |
| 4,700,912 | 10/1987 | Corbett | 244/63 |
| 4,707,696 | 11/1987 | Task et al. | 340/954 |
| 4,862,164 | 8/1989 | Croley et al. | 340/952 |
| 5,200,748 | 4/1993 | Attfield | 340/953 |
| 5,448,235 | 9/1995 | O'Neill, Jr. et al. | 340/956 |
| 5,519,590 | 5/1996 | Crookham et al. | 362/62 |
| 5,531,402 | 7/1996 | Dahl | 244/75 R |
| 5,584,137 | 12/1996 | Teetzel | 42/103 |
| 5,593,114 | 1/1997 | Ruhl | 244/183 |
| 5,909,062 | 6/1999 | Krietzman | 307/6 A |

FOREIGN PATENT DOCUMENTS

| | | |
|---|---|---|
| 0 283 441 A2 | 9/1988 | European Pat. Off. . |
| 2 202 980 | 10/1988 | United Kingdom . |
| WO 92/04232 | 3/1992 | WIPO . |

*Primary Examiner*—Laura K. Tso
*Attorney, Agent, or Firm*—Richard C. Litman

[57] ABSTRACT

A laser lighting system which employs employ visible and reflective laser beam lighting sources to provide illumination of airport runways and taxiways, preferred approach and departure routes, seaplane base landing areas, marine waterways, as well as to assist in search and rescue operations. The laser lighting system may be a laser lighting post or a laser lighting unit for providing radiation along a surface that includes at least one laser for producing a beam of coherent visible or reflective radiation, and a glass plano-convex cylindrical lens which has an aspherical convex cylindrical surface for generating a laser line which is uniformally illuminated from end to end. The laser lighting post includes a mounting column which has an access door for providing access to a tilt switch assembly and an AC/DC power adapter unit. The mounting column is attached to a base plate by a frangible coupling. The laser lighting unit includes a case containing a flashlight light bulb, at least one battery, and laser switch means for selectively energizing the laser via the at least one battery. The laser lighting unit also includes a light bulb switch means for selectively energizing the light bulb via the at least one battery. The laser lighting unit may also include an enlarged end to form a head having a front opening which is spanned by a parent lens. The laser lighting unit may also include a parabolic reflector.

9 Claims, 17 Drawing Sheets

LASER LIGHTING SYSTEM

CROSS REFERENCE TO RELATED APPLICATIONS

This is a continuation-in-part of application Ser. No. 08/992,584 filed on Dec. 17, 1997, now abandoned.

BACKGROUND OF THE INVENTION

1. Field of the Invention

The present invention relates to lighting sources which employ visible and reflective laser beams to provide illumination of airport runways and taxiways, preferred approach and departure routes, helipads, seaplane base landing areas, marine waterways, as well as to assist in search and rescue operations.

2. Description of the Related Art

Many airports handle different types of aircraft ranging from highly sophisticated and complex military aircraft and commercial airliners to ultra-simple single engine airplanes with little in the way of navigation or communication capabilities. Further, the pilot's experience and ability associated with these different aircraft also varies greatly. Edges and center lines of runways and taxiways are typically illuminated with individual incandescent lamps of comparatively high candle power. The type of illumination utilized in many previous systems exhibited a comparatively high installation cost. The power requirements for such prior systems also were excessive, and the systems were expensive to maintain. The construction and maintenance of a standard electrical illuminating system in certain areas is not always practical. Federal Regulations require these areas to be "lit" for night operations. This invention uses lighting sources which employ visible and reflective laser beams to provide illumination of airport runways and taxiways, preferred approach and departure routes, seaplane base landing areas, marine waterways, as well as to assist in search and rescue operations.

The related art is represented by the following patents of interest.

U.S. Pat. No. 3,866,032, issued on Feb. 11, 1975 to Raymond M. Veres, describes an illumination system for providing center and edge stripes for an airport runway, in which six laser generating stations are respectively arranged in with relationship with the ends of the proposed stripes. Veres does not suggest a laser lighting system according to the claimed invention.

U.S. Pat. No. 4,291,294, issued on Sep. 22, 1981 to Wendell D. Chase, describes a landing approach lighting system which utilizes red warning lights to delineate the runway approach with additional blue lights juxtaposed with the red lights such that the red lights are chromatically balanced. Chase does not suggest a laser lighting system according to the claimed invention.

U.S. Pat. No. 4,554,543, issued on Nov. 19, 1985 to Ivan S. Wyatt et al., describes a glide slope indicator system in which light from an incoming aircraft's landing light is shaped by a spherical/cylindrical lens combination into a line image which strikes a linear photodiode array. Wyatt et al. do not suggest a laser lighting system according to the claimed invention.

U.S. Pat. No. 4,700,912, issued on Oct. 20, 1987 to Marshall J. Corbett, describes a laser system for illuminating a column of air which captures an aircraft thereby enabling a pilot to see the air column and "bucket" during take-off and landing. Corbett does not suggest a laser lighting system according to the claimed invention.

U.S. Pat. No. 4,707,696, issued on Nov. 17, 1987 to Harry L. Task et al., describes a portable glide slope indicator including a pair of light sources, one projecting a steady beam and one projecting a blinking beam. Task et al. do not suggest a laser lighting system according to the claimed invention.

U.S. Pat. No. 4,862,164, issued on Aug. 29, 1989 to Henry C. Croley et al., describes a portable infrared landing site illumination system for fixed wing and rotary wing aircraft having night vision capabilities as provided by the Army's second generation goggles (PVS-5) or the third generation goggles (ANVIS). Croley et al. do not suggest a laser lighting system according to the claimed invention.

U.S. Pat. No. 5,531,402, issued on Jul. 2, 1996 to Robert M. Dahl, describes a wireless flight control system. Dahl does not suggest a laser lighting system according to the claimed invention.

U.S. Pat. No. 5,593,114, issued on Jan. 14, 1997 to Louis F. Ruhl, describes an landing system which allows the pilot to view the approach scene with the use of a forward looking radar or equivalent sensor which provides the means of identifying the runways and the airport and land the aircraft using the automatic landing systems on virtually all types of aircraft. Ruhl does not suggest a laser lighting system according to the claimed invention.

European Patent Number 0 283 441 A2, published on Sep. 21, 1988, describes a lighting system employing light sources and prism elements. European '441 does not suggest a laser lighting system according to the claimed invention.

Great Britain Patent Application Number 2,202,980 A, published on Oct. 5, 1988, describes a flight path indicator including a plurality of individual light sources, beam-forming means for directing light from each of the light sources through a respective color filter and lens system to produce a plurality of differently colored diverging light beams and means for directing the beams at different inclinations to define different angular sectors. Great Britain '980 does not suggest a laser lighting system according to the claimed invention.

International Patent document WO 92/04232, published on Mar. 19, 1992, describes a marker light for airfields that includes a light source and a prism so as to provide two light beams with a desired elevational angle relative to the ground level plane. International '232 does not suggest a laser lighting system according to the claimed invention.

None of the above inventions and patents, taken either singularly or in combination, is seen to describe the instant invention as claimed.

SUMMARY OF THE INVENTION

The present invention is a laser lighting system which employs employ visible and reflective laser beam lighting sources to provide illumination of airport runways and taxiways, preferred approach and departure routes, seaplane base landing areas, marine waterways, as well as to assist in search and rescue operations. One inventive laser lighting system includes three laser radiation stations at either end of a runway. The runway additionally includes a plurality of reflectors, however these are not required. The reflectors are fabricated from reflectorizing material. The three laser radiation stations at either end of the runway are respectively positioned in spaced relation and in line with the edges and the centerline of the runway. Each radiation station can be activated manually or by remote control radio signals using standard five click switching devices.

Each radiation station includes a plurality of laser generators, preferably three or more. The placement of these laser generators are well below the glide path of landing aircraft but at sufficient height for each of the laser generators to strike all of the reflectors including the threshold markers and runway end identifiers. The laser generators are powered by conventional power supplies. However, the laser generators may also be powered by a storage battery recharged by a solar panel. The laser generators are shielded with adjustable shields so as to project light only on desired targets. The shields are adjusted through the rotation of vernier adjusters.

Each laser generator is of conventional construction and typically comprises a mixed gas or diode laser. Each generator produces either a rotating, oscillating, or refractive laser. A refractive laser comprises a fixed laser generator equipped with prism lens, preferably a line generator optics lens, which results in transmission of a vertical beam of light. The line generating optics is preferably a glass plano-convex cylindrical lens of which the cylindrical convex surface is aspherical rather than spherical in shape in order to eliminate spherical aberration in the lens. With a standard spherical or rod lens, the projected laser line results in a Gaussian line, i.e. brighter in the center and dim at the outer ends. When this spherical curve is altered, or aspherized, to the proper parameters, the resultant projected laser line becomes uniformly illuminated from end to end. Each generator produces a beam of coherent visible radiation from about 400 to about 700 nanometers, preferably in the range of 488 to 0.670 nanometers, having a diameter of the order 1.5 millimeters. The laser beam preferably is green in color for maximum visibility.

A laser lighting post according to the invention for providing radiation along a surface that includes one laser for producing a beam of coherent visible or reflective radiation, and a glass plano-convex cylindrical lens which has an aspherical convex cylindrical surface for generating a laser line which is uniformally illuminated from end to end. The laser lighting post also includes a mounting column which has an access door for providing access to a tilt switch assembly and an AC/DC power adapter unit. The mounting column is attached to a base plate by a frangible coupling.

A laser lighting unit according to the invention for providing radiation along a surface includes at least one laser for producing a beam of coherent visible or reflective radiation, and a glass plano-convex cylindrical lens which has an aspherical convex cylindrical surface for generating a laser line which is uniformally illuminated from end to end. The laser lighting unit may also include a case containing a flashlight light bulb, at least one battery, and laser switch means for selectively energizing the laser via the at least one battery. The laser lighting unit also includes a light bulb switch means for selectively energizing the light bulb via the at least one battery. The laser lighting unit may also include an enlarged end to form a head having a front opening which is spanned by a parent lens. The laser lighting unit may also include a parabolic reflector.

Accordingly, it is a principal object of the invention to provide a laser lighting system which uses visible and reflective laser beams to illuminate airport runways and taxiways, preferred approach and departure routes, seaplane base landing areas, marine waterways, as well as to assist in search and rescue operations.

It is another object of the invention to provide a laser lighting system post for providing radiation along a surface that includes one laser for producing a beam of coherent visible or reflective radiation, and a glass plano-convex cylindrical lens which has an aspherical convex cylindrical surface for generating a laser line which is uniformally illuminated from end to end.

It is a further object to provide a laser lighting unit which includes a case containing a flashlight light bulb, at least one battery, and laser switch means for selectively energizing the laser via the at least one battery.

It is an object of the invention to provide improved elements and arrangements thereof in a laser lighting system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
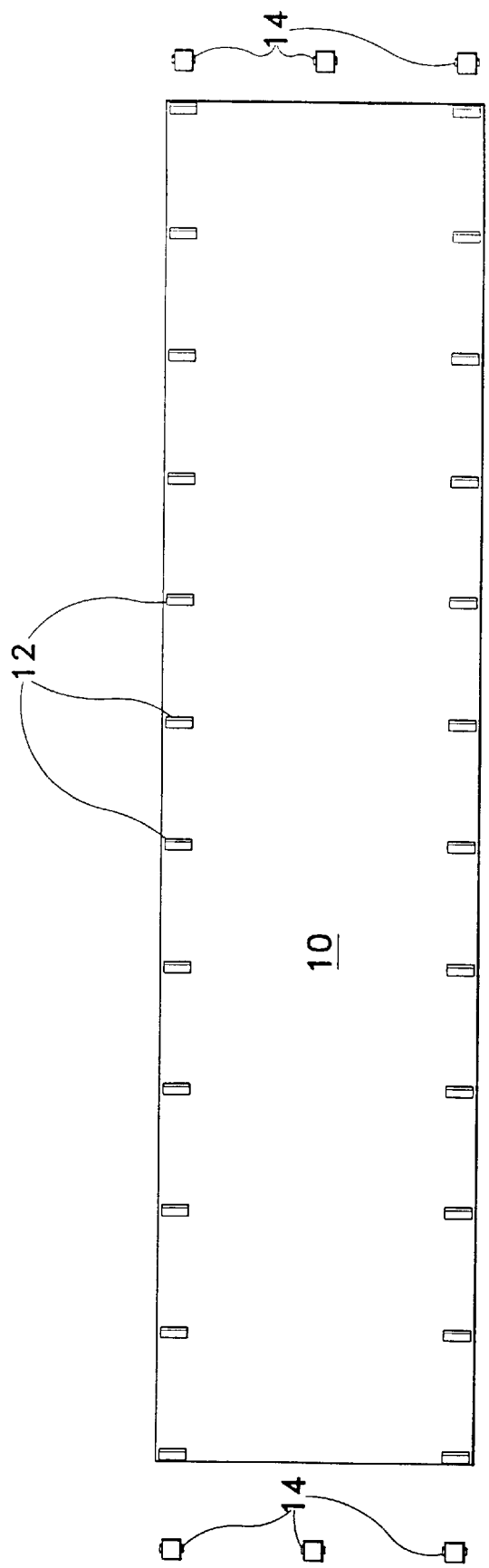
FIG. 1 is a top view of a runway equipped with a laser lighting system according to the present invention.

Referring to FIG. 1 of the drawings, there is shown a first runway 10 equipped with a laser lighting system for indicating to incoming aircraft a desired, preferred or required path of travel. The laser lighting system includes three laser radiation stations 14 at either end of the runway 10. The runway 10 additionally includes a plurality of reflectors 12, however these are not required. The reflectors 12 are fabricated from reflectorizing material. The three laser radiation stations 14 at either end of the runway 10 are respectively positioned in spaced relation and in line with the edges and the centerline of the runway 10.

Figure 2:
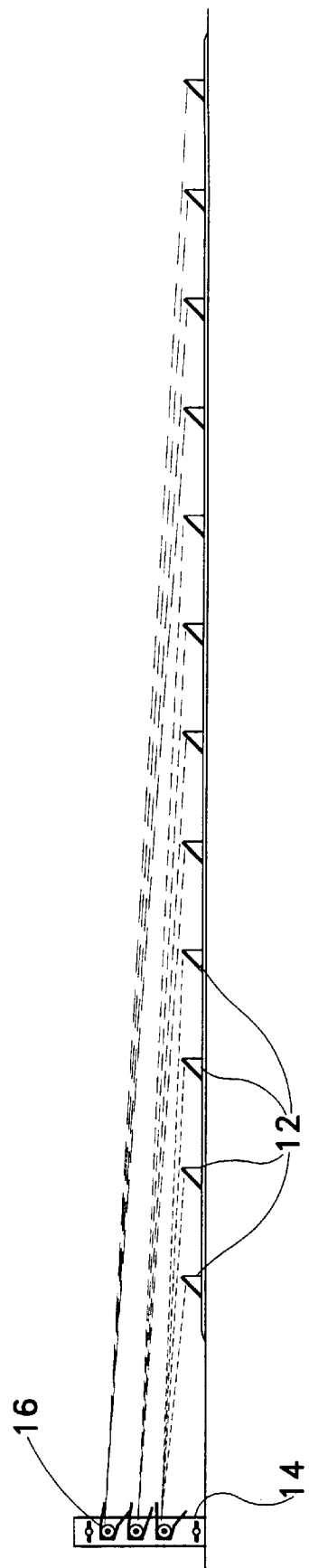
FIG. 2 is a side view of the runway shown in FIG. 1.
Figure 3:
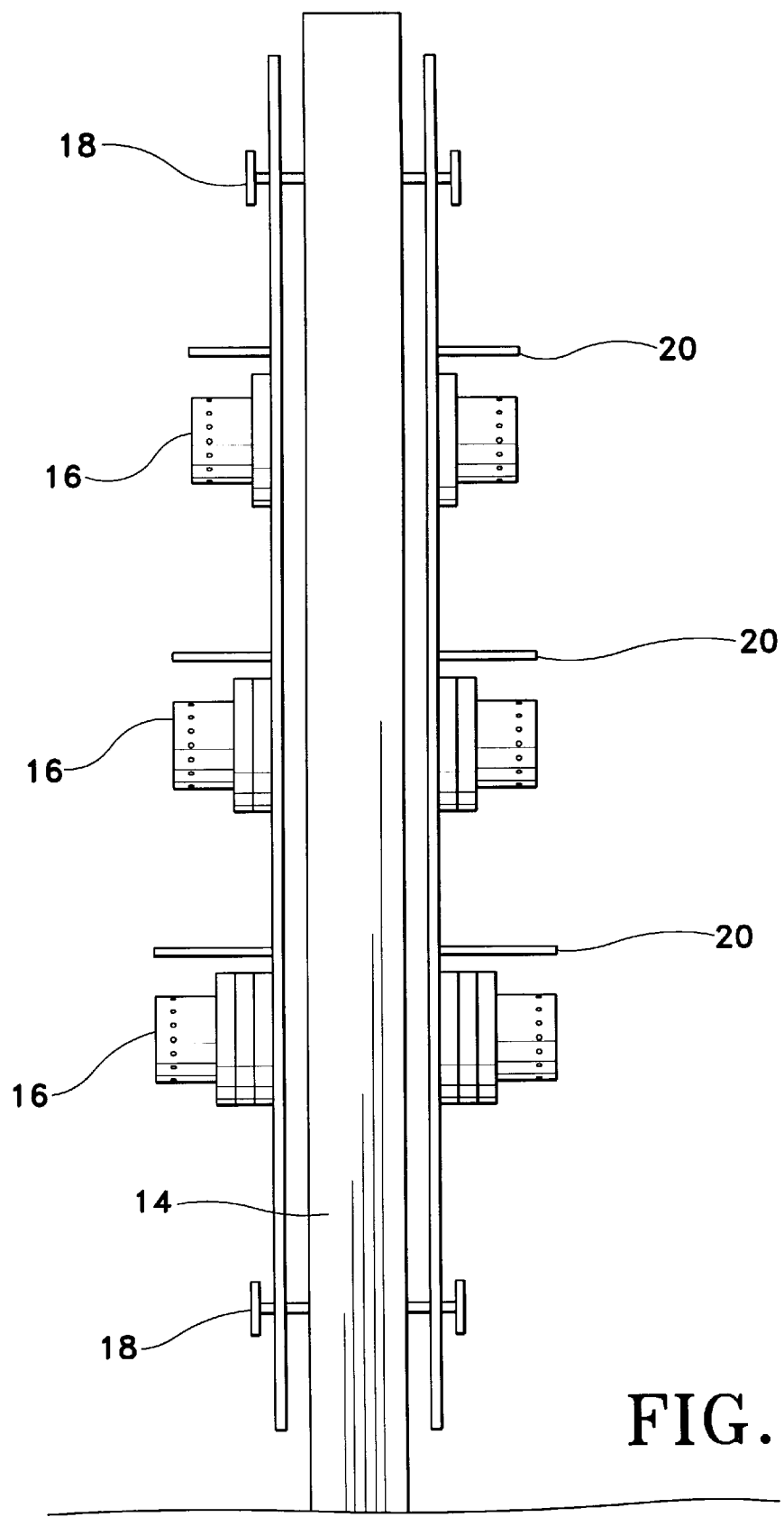
FIG. 3 is a front view of a laser lighting post according to the invention.
Figure 4:
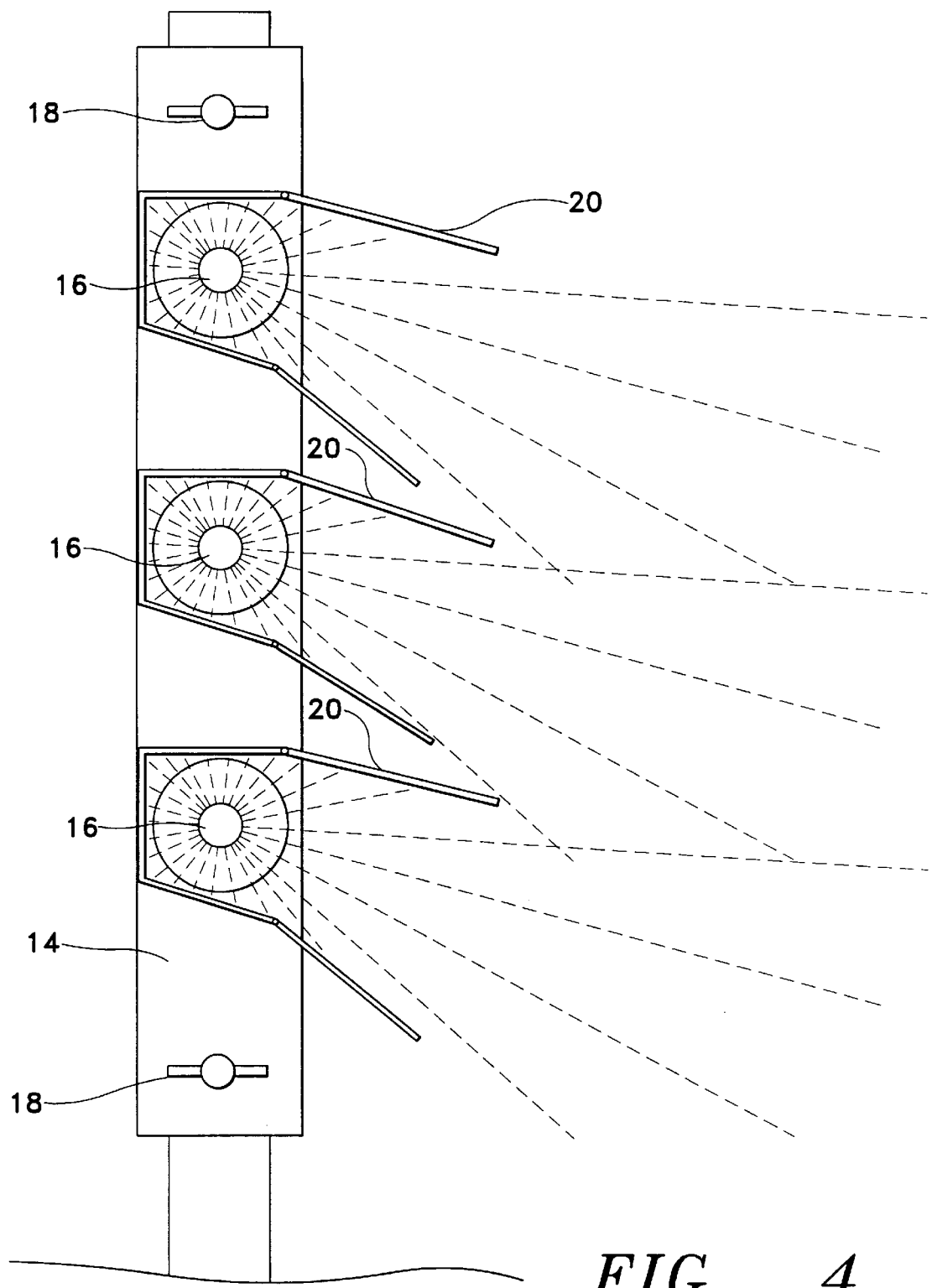
FIG. 4 is a side view of the laser lighting post shown in FIG. 3.

As shown in FIGS. 2–4, each radiation station 14 includes a plurality of laser generators 16, preferably three or more. The placement of these laser generators 16 are well below the glide path of landing aircraft but at sufficient height for each of the laser generators 16 to strike all of the reflectors 12 including the threshold markers and runway end identifiers. The laser generators 16 are powered by conventional power supplies. The laser generators 16 are shielded with adjustable shields 20 so as to project light only on desired targets. The shields are adjusted through the rotation of vernier adjusters 18. The arrival and departure corridors if applicable are indicated by visible mean lasers projected from similar laser generators. Additional lasers may target reflective devices placed on obstacles such as terrain or obstructions in the vicinity of such airports. The laser generators can be activated manually or by remote control radio signals using standard five click switching devices.

Each laser generator 16 is of conventional construction and typically comprises a mixed gas or diode laser. Each generator 16 produces either a rotating, oscillating, or refractive laser. A refractive laser comprises a fixed laser generator equipped with prism lens, preferably a line generator lens, which results in transmission of a vertical beam of light. Each generator 16 produces a beam of coherent visible radiation from about 400 to about 700 nanometers, preferably in the range of 488 to 670 nanometers, having a diameter of the order 1.5 millimeters. The laser beam preferably is green in color for maximum visibility.

Figure 5:
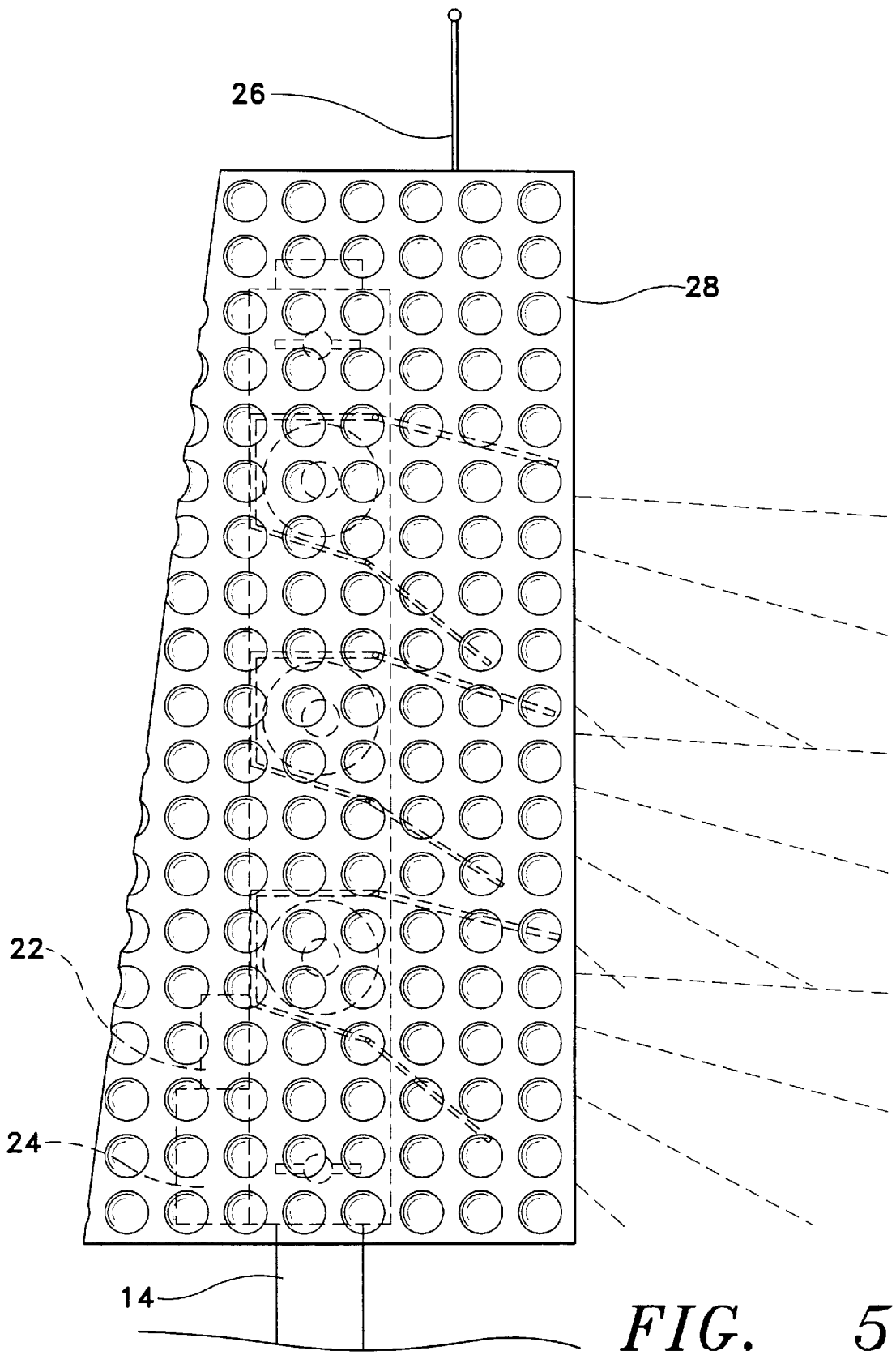
FIG. 5 is a side view of another laser lighting post according to the invention.

FIG. 5 illustrates another laser radiation station according to the invention. The laser radiation station includes a post 14 with a plurality of shielded laser generators mounted thereon similar to the laser radiation stations shown in FIGS. 2–4. However, in this case the laser generators are powered by a storage battery 24 recharged by a solar panel 28 which additionally acts as a protective cover. The laser radiation station also includes an antenna 26 mounted at the top of the station which receives incoming signals that activate the laser radiation station through the use of a radio activator 22.

Figure 6:
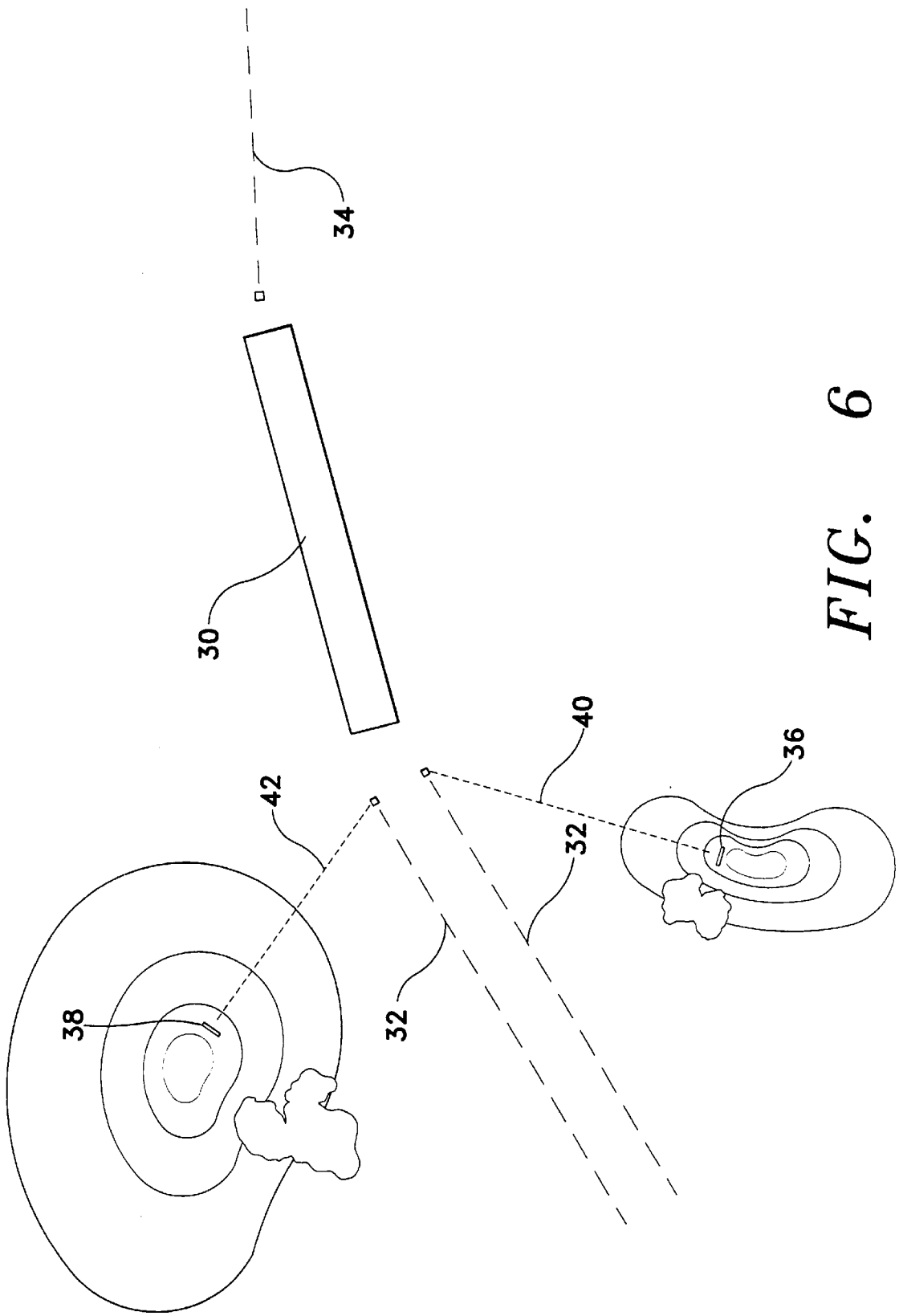
FIG. 6 is a top view of a second runway equipped with a laser lighting system according to the invention.

FIG. 6 illustrates a second runway 30 equipped with visible and reflective laser radiation stations. Visible approach laser beams 32 are transmitted to give incoming pilots an indication of the preferable approach path to the runway 30. A visible departure laser beam 34 is also transmitted to give outgoing pilots an indication of the preferable departure path from runway 30. In addition to the visible laser beams 32 and 34, FIG. 6 additionally includes reflective laser beams 40 and 42 which respectively reflect off of reflectors 36 and 38 which are mounted on hilly obstacles which should be avoided.

Figure 7:
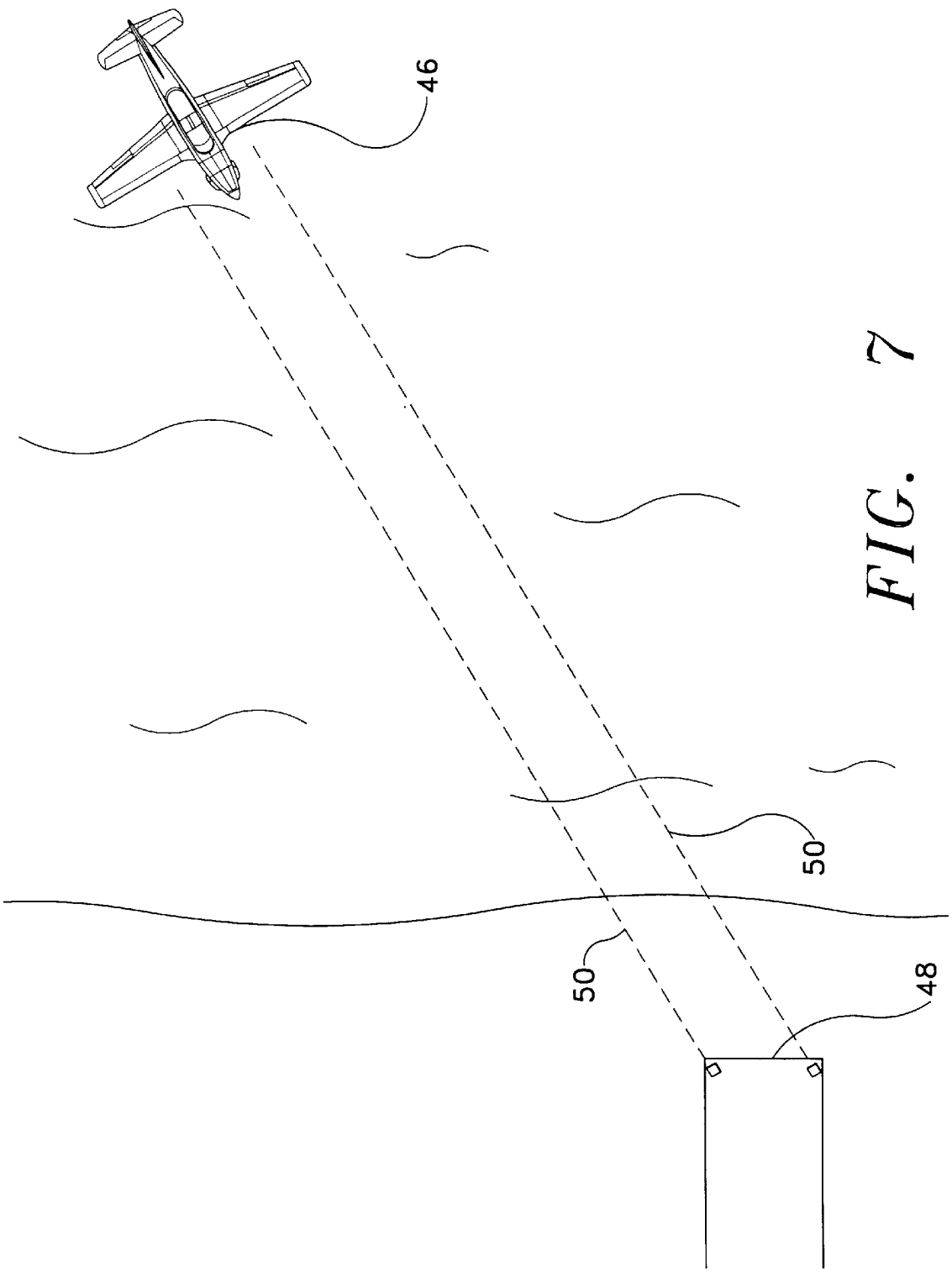
FIG. 7 is a top view of a marine waterway equipped with a laser lighting system according the invention.

An application for a seaplane or skiplane base on a first marine waterway is shown in FIG. 7. The laser beams may terminate on the opposite shore or end in infinity. An aircraft 46 is flying toward a dock 48 which includes laser generators mounted thereon that transmit visible laser beams 50 to indicate a preferred approach path to the dock 48. The visible laser beams 50 are transmitted a suitable location, such as about one foot above the water or ice of the waterway, on a horizontal plane.

Figure 8:
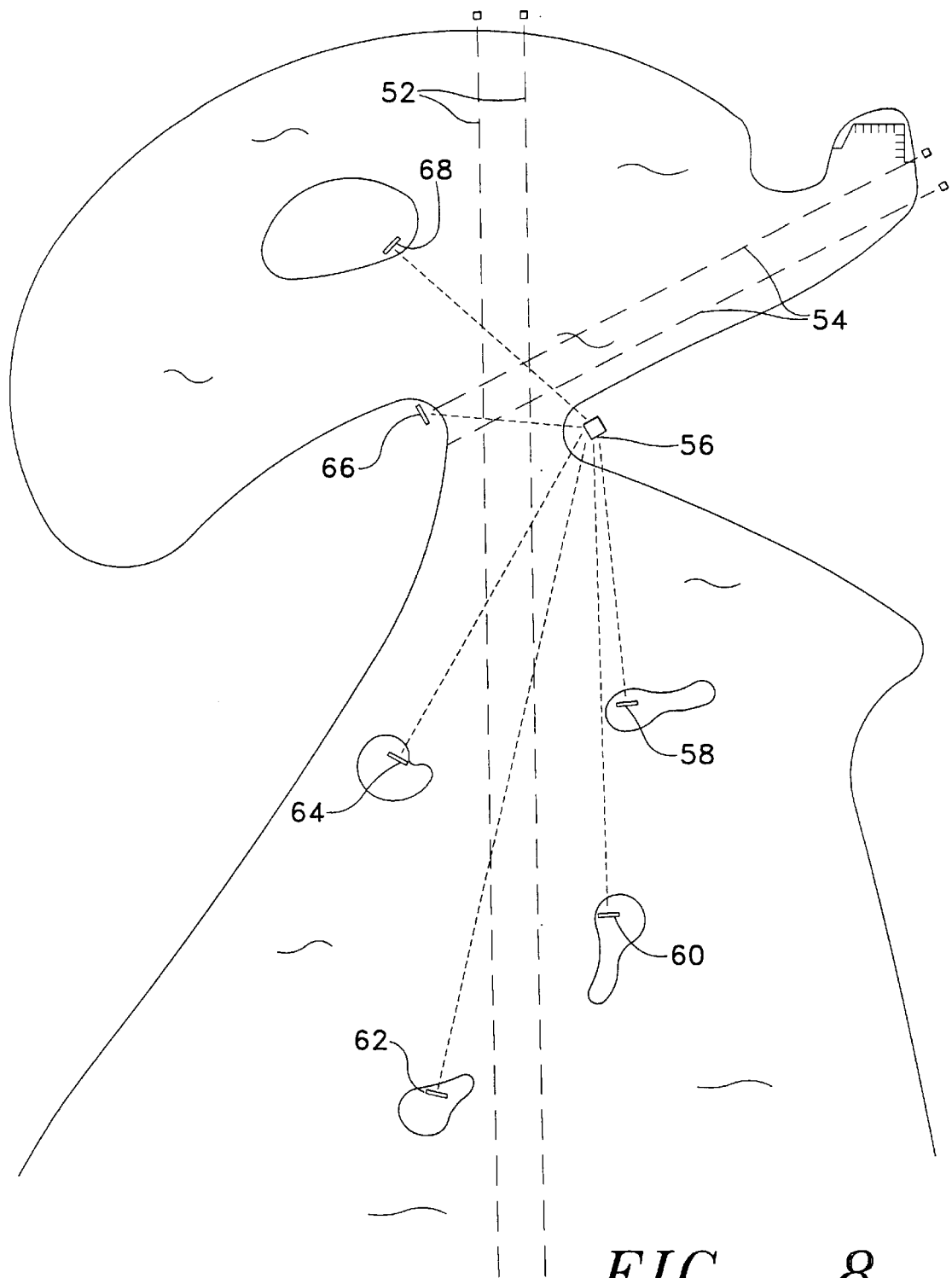
FIG. 8 is a top view of another marine waterway equipped with a laser lighting system according the invention.

A second marine waterway is illustrated in FIG. 8. Two sets of visible laser beams 52 and 54 are transmitted a small distance over the waterway to indicate preferable docking approach paths to landing docks. Visible laser beams are placed on floating structures to indicate safe passage to and from harbors, moorages, and channels. In addition, the marine waterway includes the use of a reflective laser radiation station 56. The reflective laser radiation station transmits reflective laser beams that target reflective devices 58, 60, 62, 64, 66, and 68 that are placed on or around permanent or temporary obstacles, hazards and markers.

Figure 9:
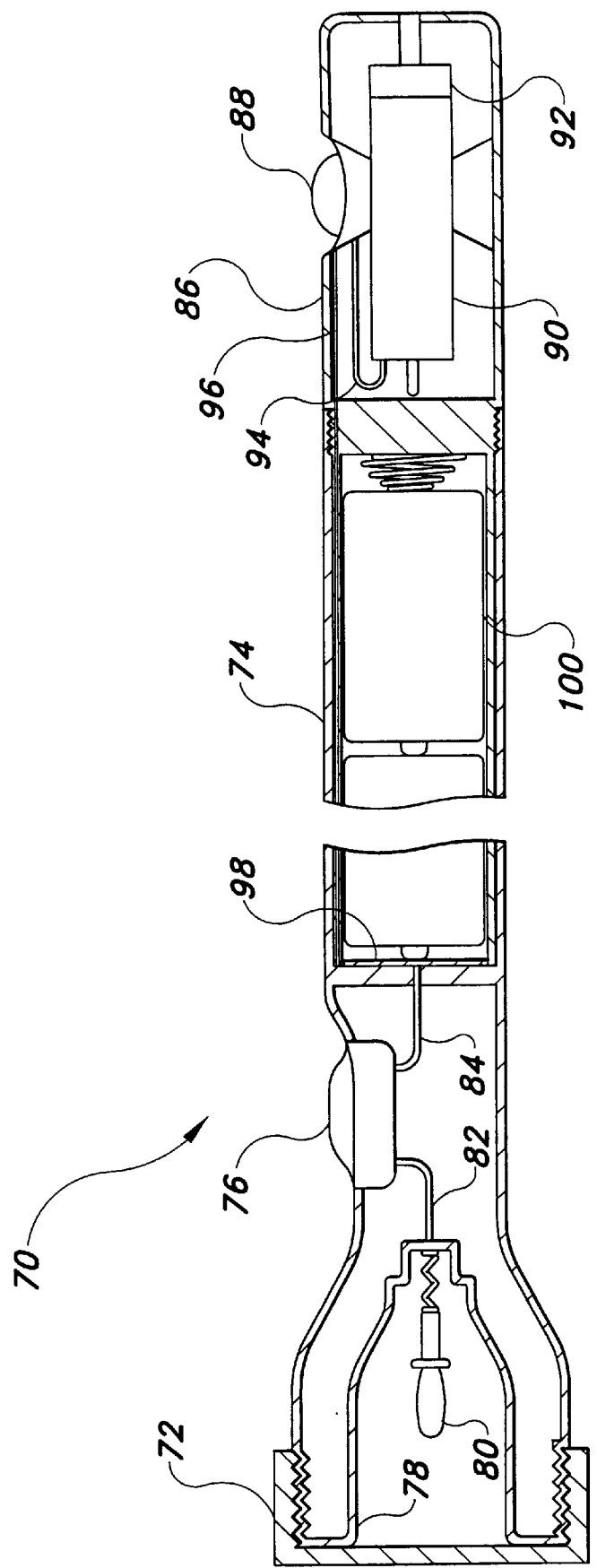
FIG. 9 is a side view of a handheld laser lighting unit according to the invention that includes a flashlight.

FIG. 9 shows a laser lighting unit 70 in the form of a handheld flashlight for use in search and rescue operations. When people are stranded in the water due to an accident or other misfortune, oftentimes search and rescue personnel are sent into the area to locate the missing individuals. The laser lighting unit 70 enhances the ability of search and rescue personnel to locate missing individuals. The laser lighting unit 70 includes a case 74 containing a flashlight light bulb 80 and switch means 76 for selectively energizing the light bulb 80 from batteries 100 to illuminate the light bulb 80 via wiring 82 and 84. The case 74 is cylindrical in shape and receives the front end of a case 86 which is screwed into the end of case 74. The front end of case 86 contains a battery compartment for receiving a plurality of batteries 100, typically D size batteries, in series relation to form a power source. The front portion of the case 74 is enlarged to form a head having a front opening or aperture spanned by a parent lens 72. Within the head behind the light bulb 80 is a generally parabolic reflector 78. The light bulb 80 is situated approximately at the focus of the reflector 78 and is removably mounted within a cup holder at the rear of the reflector 78. Within the holder behind the light bulb 80 is a compression spring. This spring seats at its front end against a base end contact of the light bulb 80 and at its rear end against a contact at the rear end of the holder.

The rear end of case 86 contains a laser 90 including a lens 92 for directing the generated laser light. The lens 92 is a line generating optic comprising a glass plano-convex cylindrical lens having an aspherical cylindrical convex surface which is critical for generating a laser line which is uniformally illuminated from end to end. Conventional cylindrical lens employ a spherical cylindrical convex surface which, when employed with lasers, results in a Gaussian line, i.e. brighter in the center and dim at the outer ends. When this spherical cylindrical convex surface is altered, or aspherized, to the proper parameters, the resultant projected laser line becomes uniformly illuminated from end to end. The laser 90 is powered by means of switch means 88 which selectively energizes the laser 90 via wiring 94 which provides power from switch means 88 delivered through wiring 96 which interconnects a metal lid 98 of case 86 within which the batteries 100 are placed. The projected laser line is emitted through the rear end of case 86 through a small opening.

Figure 10:
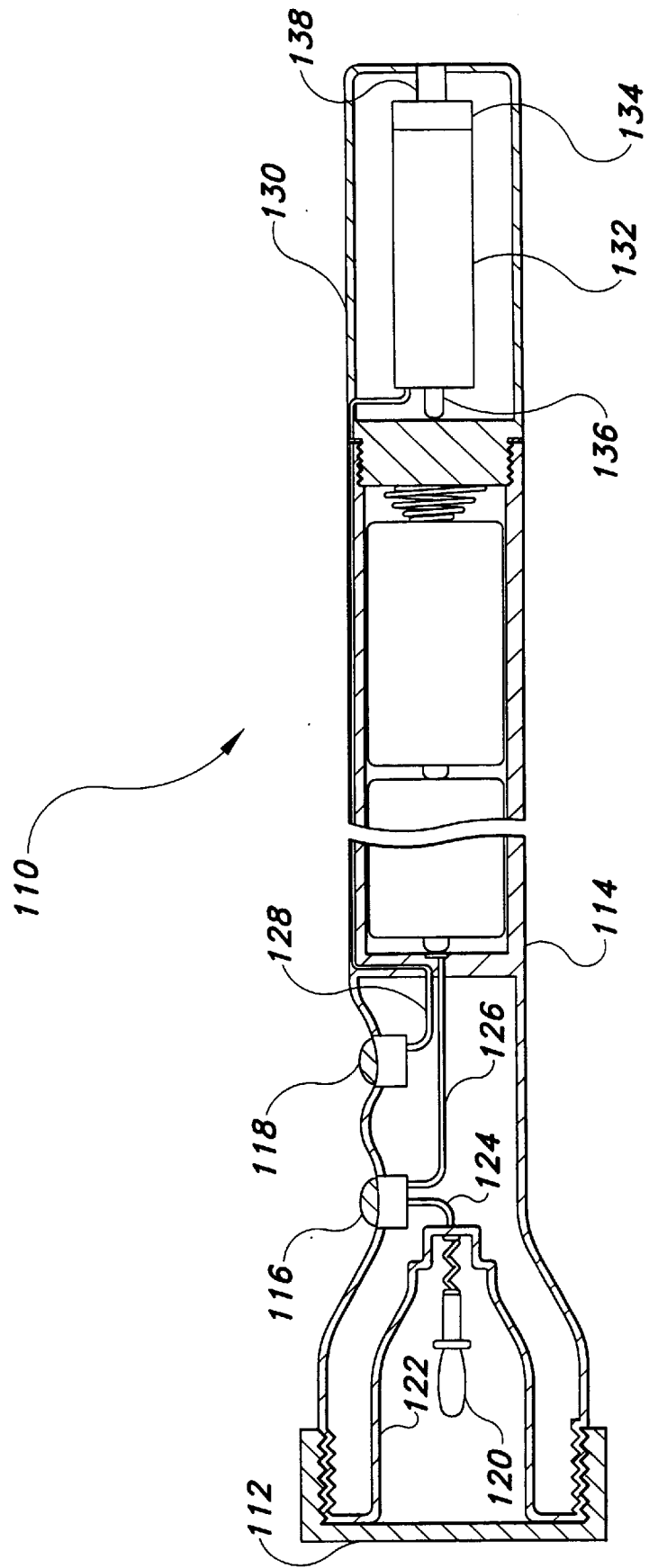
FIG. 10 is a side view of a handheld laser lighting unit according to the invention that includes a flashlight.

FIG. 10 shows a laser lighting unit 110 which is similar to the laser lighting unit 70 shown in FIG. 9. The laser lighting unit 110 includes a case 114 containing a flashlight light bulb 120 and switch means 116 for selectively energizing the light bulb 120 from batteries to illuminate the light bulb 120 via wiring 124 and 126. The case 114 is cylindrical in shape and receives the front end of a case 130 which is screwed into the end of case 114. However, case 114 also includes switch means 118 for a laser 132 at the forward end of case 114. Furthermore, case 114 is contains a battery compartment for receiving a plurality of batteries, typically D size batteries, in series relation to form a power source.

The front portion of case 114 is enlarged to form a head having a front opening or aperture spanned by a parent lens 112. Within the head behind the light bulb 120 is a generally parabolic reflector 122. The light bulb 120 is situated approximately at the focus of the reflector 122 and is removably mounted within a cup holder at the rear of the reflector 122. Within the holder behind the light bulb 120 is a compression spring. This spring seats at its front end against a base end contact of the light bulb 120 and at its rear end against a contact at the rear end of the holder.

Case 130 contains a laser 132 including a lens 134 for directing the generated laser light. The lens 134 is a line generating optic comprising a glass plano-convex cylindrical lens having an aspherical cylindrical convex surface which is critical for generating a laser line which is uniformally illuminated from end to end. The laser 132 is powered by means of switch means 118 which selectively energizes the laser 132 via wiring 128 which provides power from switch means 118 delivered by the batteries. The projected laser line is emitted through the rear end of case 130 through a small opening 138.

Figure 11:
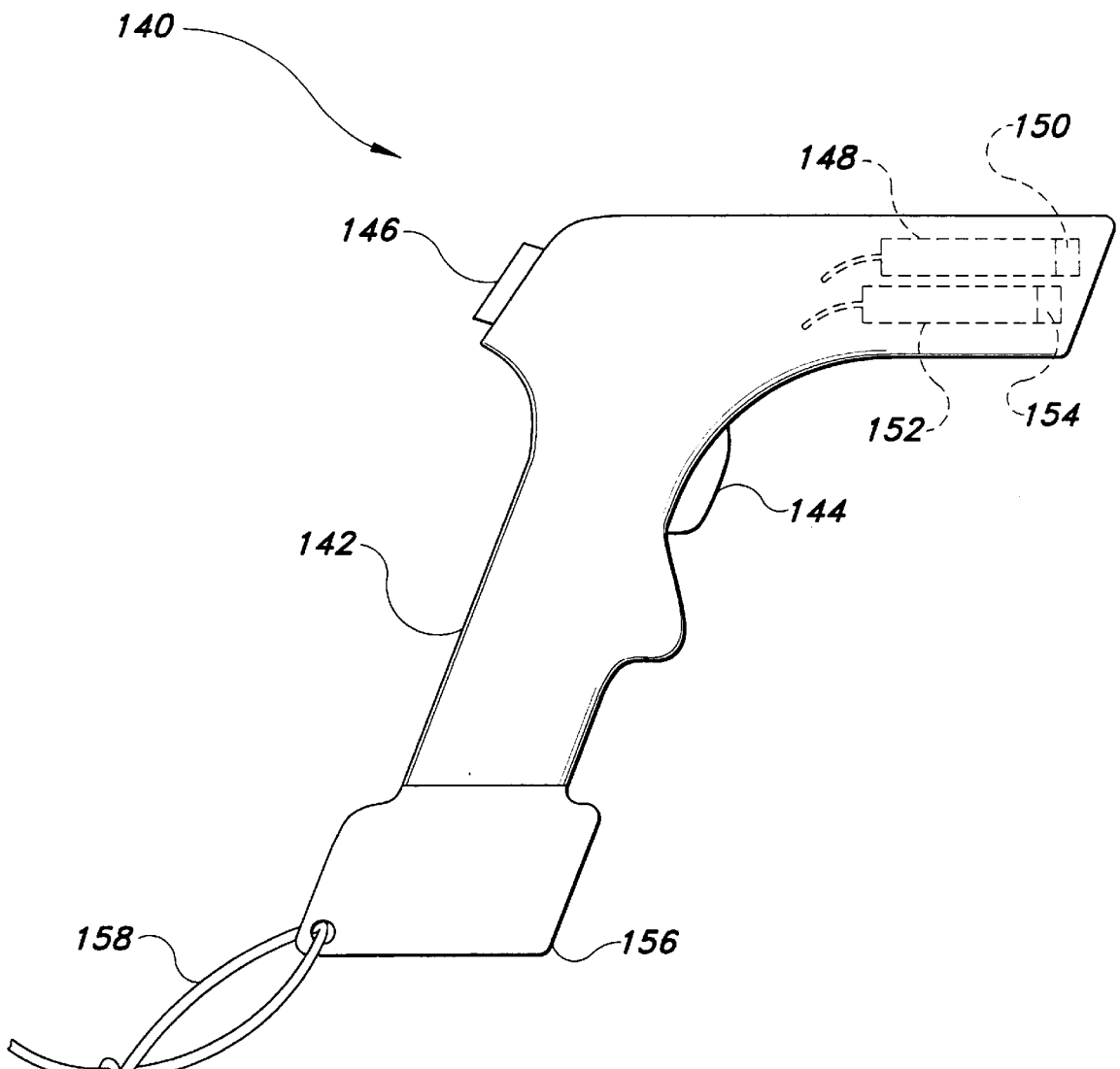
FIG. 11 is a side view of a handheld laser lighting unit according to the invention that includes two lasers in a case powered by a removable rechargeable battery pack.

FIG. 11 shows a handheld laser lighting unit 140 for use in search and rescue operations. The laser lighting unit 140 includes a case 142 containing a green laser 148 and a red laser 152 that each include a line generating optic lens 150 and 154 for directing the generated laser light. The lenses 150 and 154 each comprise a glass plano-convex cylindrical lens having an aspherical cylindrical convex surface which is critical for generating a laser line which is uniformally illuminated from end to end. The laser lighting unit 140 also includes an interchangeable rechargeable battery pack 156. The lasers 148 and 152 are selectively chosen by switch means 146 and are powered by switch means 144 which selectively energizes the lasers 148 and 152 via. wiring (not shown) which provides power from switch means 144 delivered from the battery pack 156. The projected laser line is emitted through the front end of case 142. To accommodate shipboard use, the battery pack 156 may include a safety lanyard 158 to facilitate securing the laser lighting unit to a ship.

Figure 12:
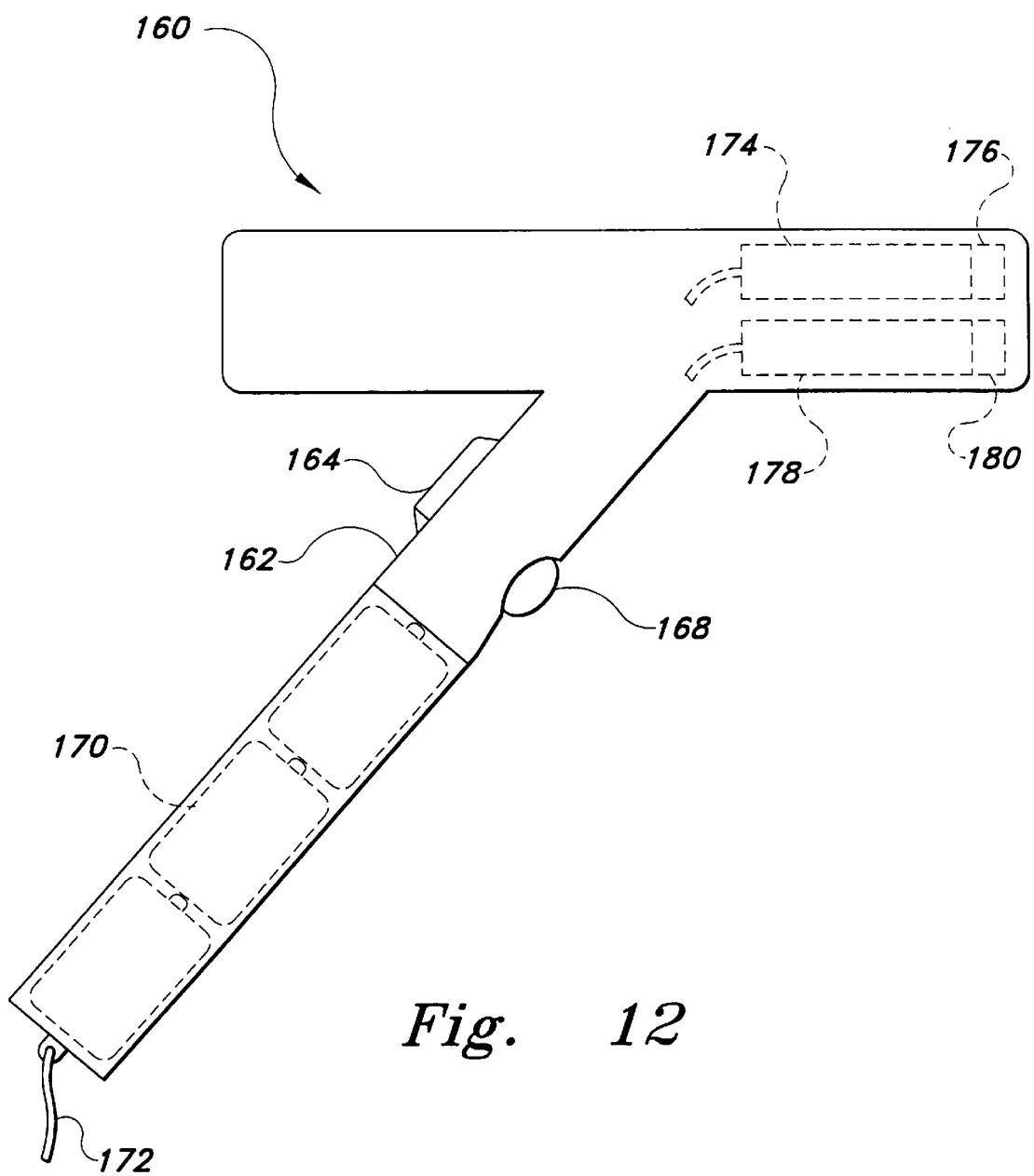
FIG. 12 is a side view of a handheld laser lighting unit according to the invention that includes two lasers in a case with three batteries.

FIG. 12 shows a handheld laser lighting unit 160 for use in search and rescue operations. The laser lighting unit 160 includes a case 162 containing a green laser 174 and a red laser 178 that each include a line generating optic lens 176 and 180 for directing the generated laser light. The lenses 176 and 180 each comprise a glass plano-convex cylindrical lens having an aspherical cylindrical convex surface which is critical for generating a laser line which is uniformally illuminated from end to end. The case 162 also receives a plurality of batteries in series relation to form a power source. The lasers 174 and 178 are selectively chosen by switch means 164 and are powered by switch means 168 which selectively energizes the lasers 174 and 178 via wiring (not shown) which provides power from switch means 144 delivered from the batteries 170. The projected laser line is emitted through the front end of case 162. To accommodate shipboard use, the case 162 may include a cording means 172 to facilitate securing the laser lighting unit to a ship.

Figure 13:
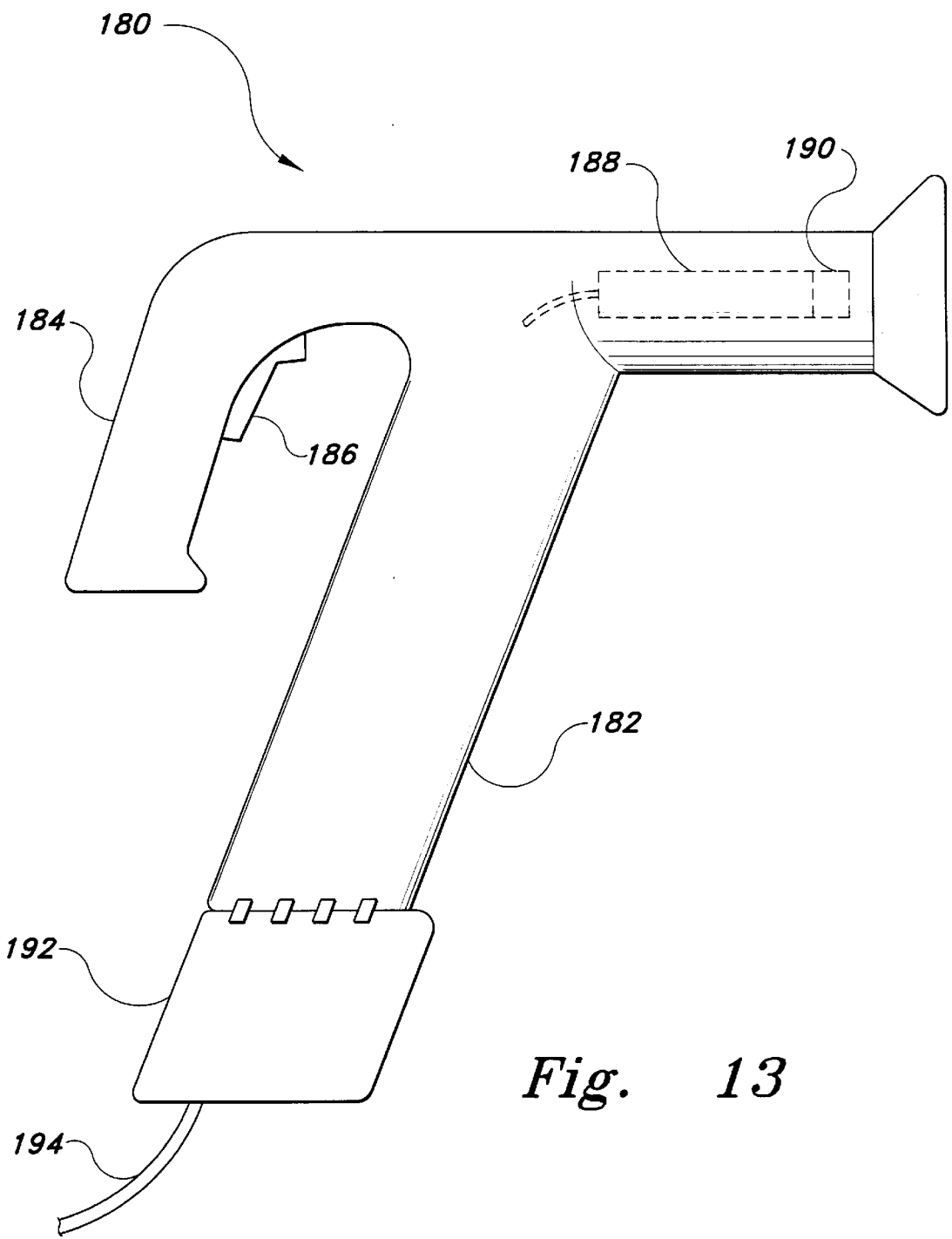
FIG. 13 is a side view of a miniaturized handheld laser lighting unit according to the invention that includes one laser in a case powered by either a removable rechargeable battery pack or shipboard power.

FIG. 13 shows a handheld laser lighting unit 180 for use in search and rescue operations. The laser lighting unit 180 includes a case 182 containing one laser 188 which includes a line generating optic lens 190 for directing the generated laser light. The lens 190 comprise a glass plano-convex cylindrical lens having an aspherical cylindrical convex surface which is critical for generating a laser line which is uniformally illuminated from end to end. The case 182 also includes an interchangeable rechargeable battery pack 192 to form a power source or, alternatively, the pack 192 may provide shipboard power via wiring means 194. The laser 188 is powered by switch means 186 which selectively energizes the laser 188 via wiring (not shown) which provides power from switch means 186 delivered from the power pack 192. The projected laser line is emitted through the front end of case 182.

Figure 14:
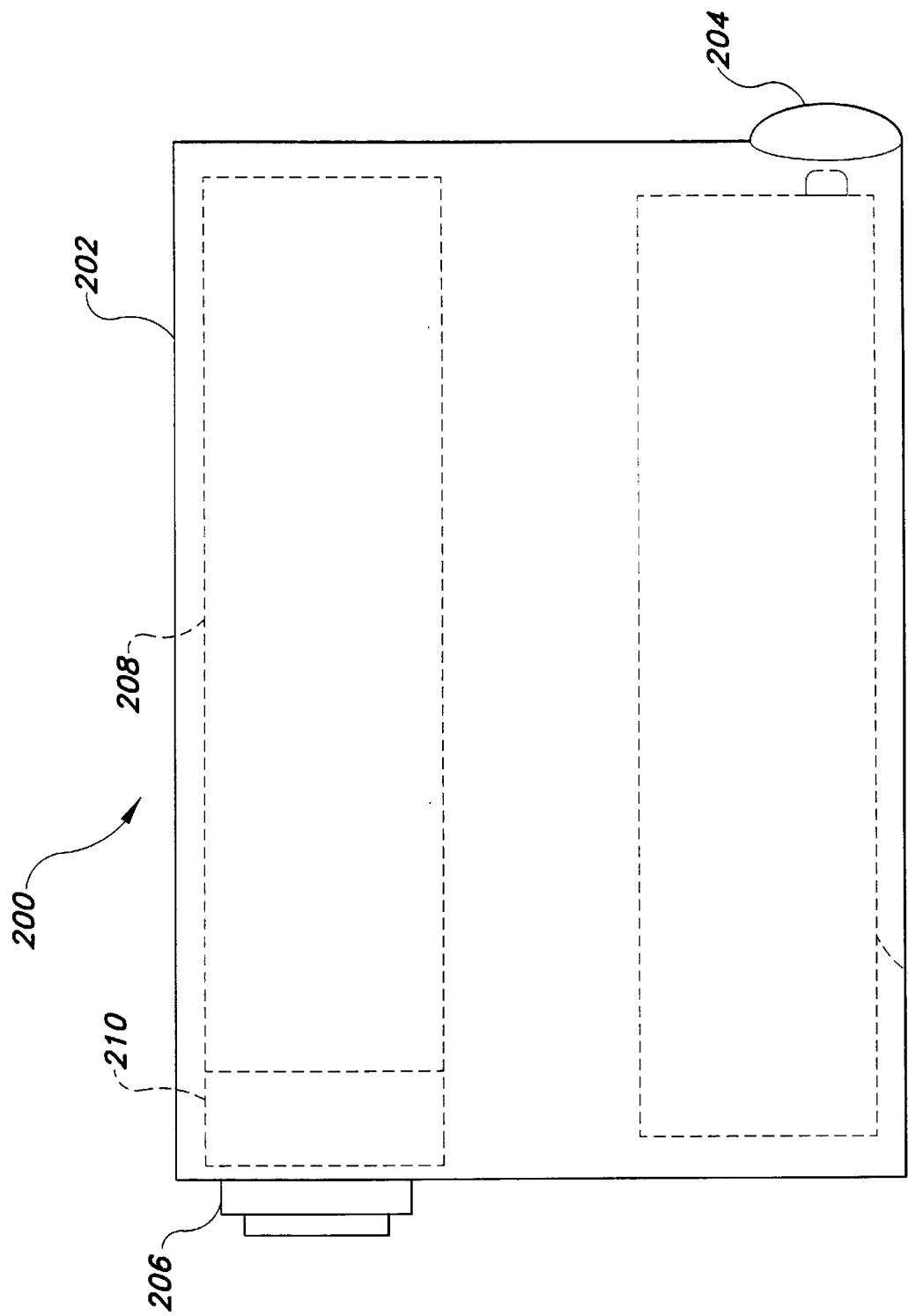
FIG. 14 is a side view of a handheld laser lighting unit according to the invention that includes one laser in a case powered by a battery.

FIG. 14 shows a miniaturized handheld laser lighting unit 200 for use in search and rescue operations. The laser lighting unit 200 includes a case 202 containing one laser 208 which includes a line generating optic lens 210 for directing the generated laser light. The lens 210 comprises a glass plano-convex cylindrical lens having an aspherical cylindrical convex surface which is critical for generating a laser line which is uniformally illuminated from end to end. The case 202 also contains a battery 212 which forms a power source. The laser 208 is powered by switch means 204 which selectively energizes the laser 208 via wiring (not shown) which provides power from switch means 204 delivered from the battery 212. The projected laser line is emitted through the front end 206 of case 202.

Figure 15:
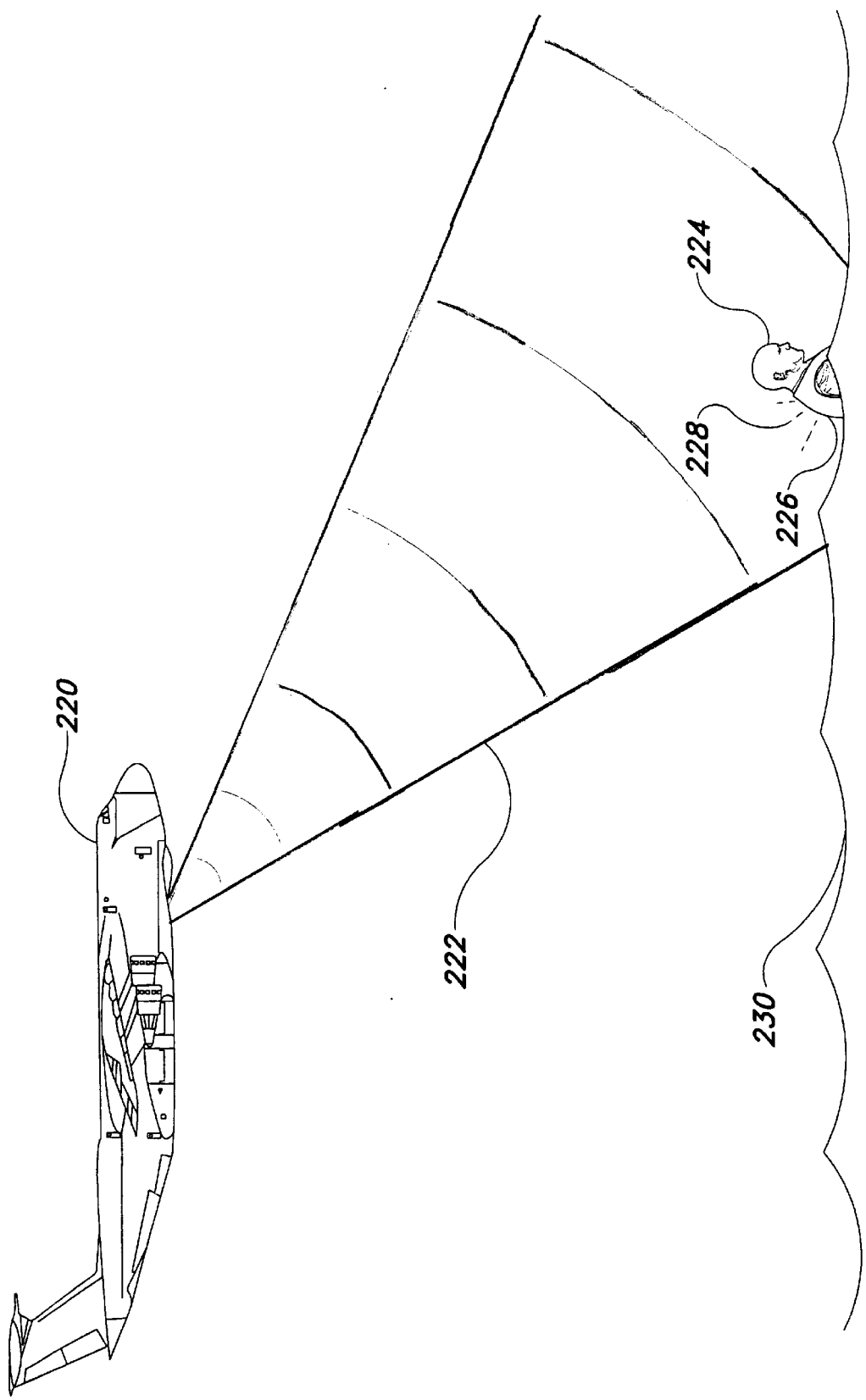
FIG. 15 is a side view of a search and rescue aircraft with a laser according to the invention locating an individual in the sea.

FIG. 15 shows an aircraft 220 using a laser lighting unit for projecting a laser beam 222 to assist in locating a missing person 224 at sea 230. In this case the missing person 224 is wearing a life vest 226 with a covering that reflects laser light 228 to enable observers in the aircraft 220 to readily identify the location of the individual. Obviously, the laser lighting unit may also be employed by a ship in the sea 230.

Figure 16:
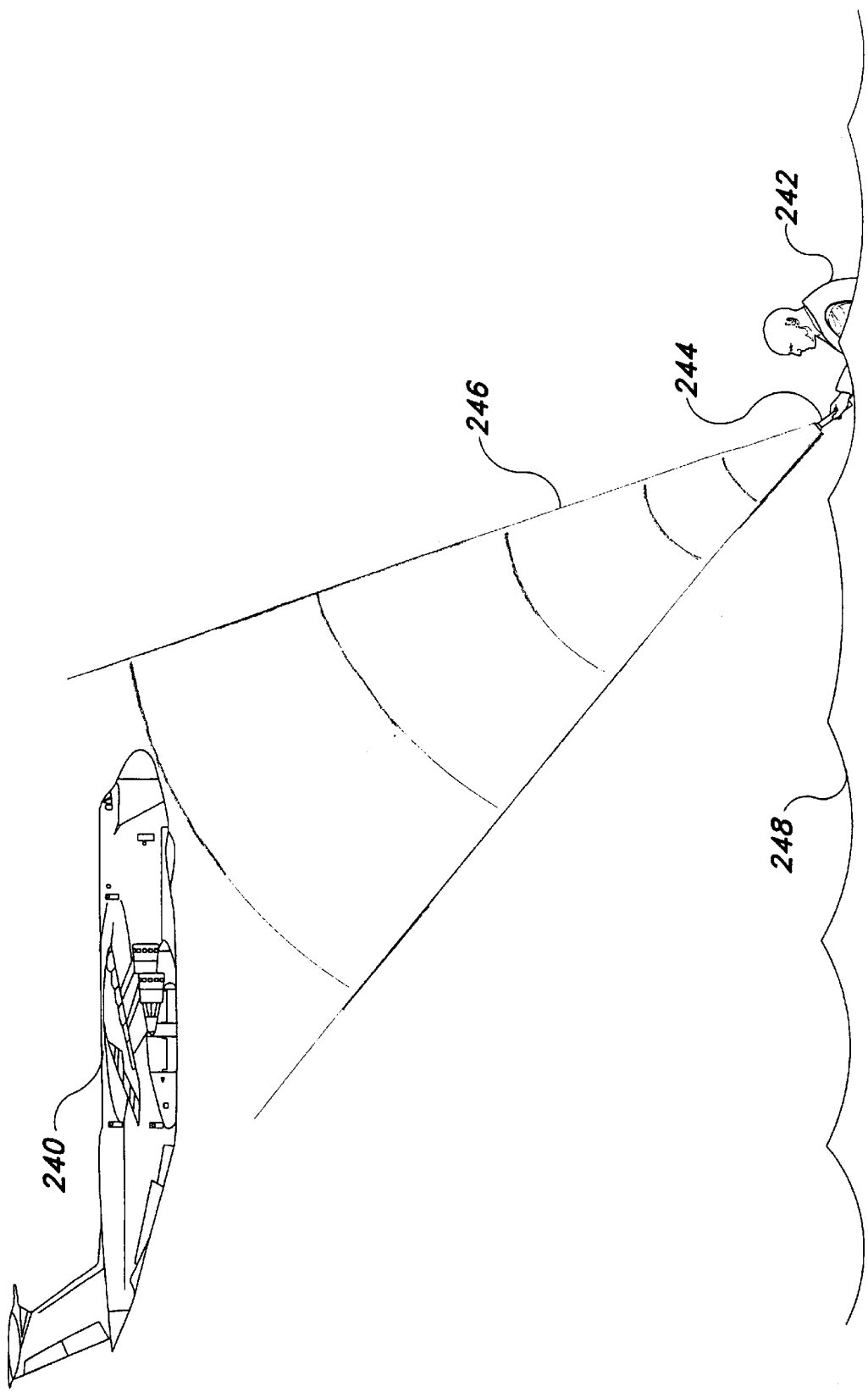
FIG. 16 is a side view of an aircraft observing an individual in the sea with a laser lighting unit according to the invention.

FIG. 16 shows a missing person 242 in the sea 248 using a laser lighting unit 244 for projecting a laser beam 246 to assist the individual 242 in being identified by an overflying aircraft 240. In this case the missing person 224 projects the laser beam 246 which will enable observers in the aircraft 220 to readily identify the location of the individual 242. Obviously, the laser lighting unit 244 may also be employed to assist the individual 242 in being identified by a ship in the sea 248.

Figure 17:
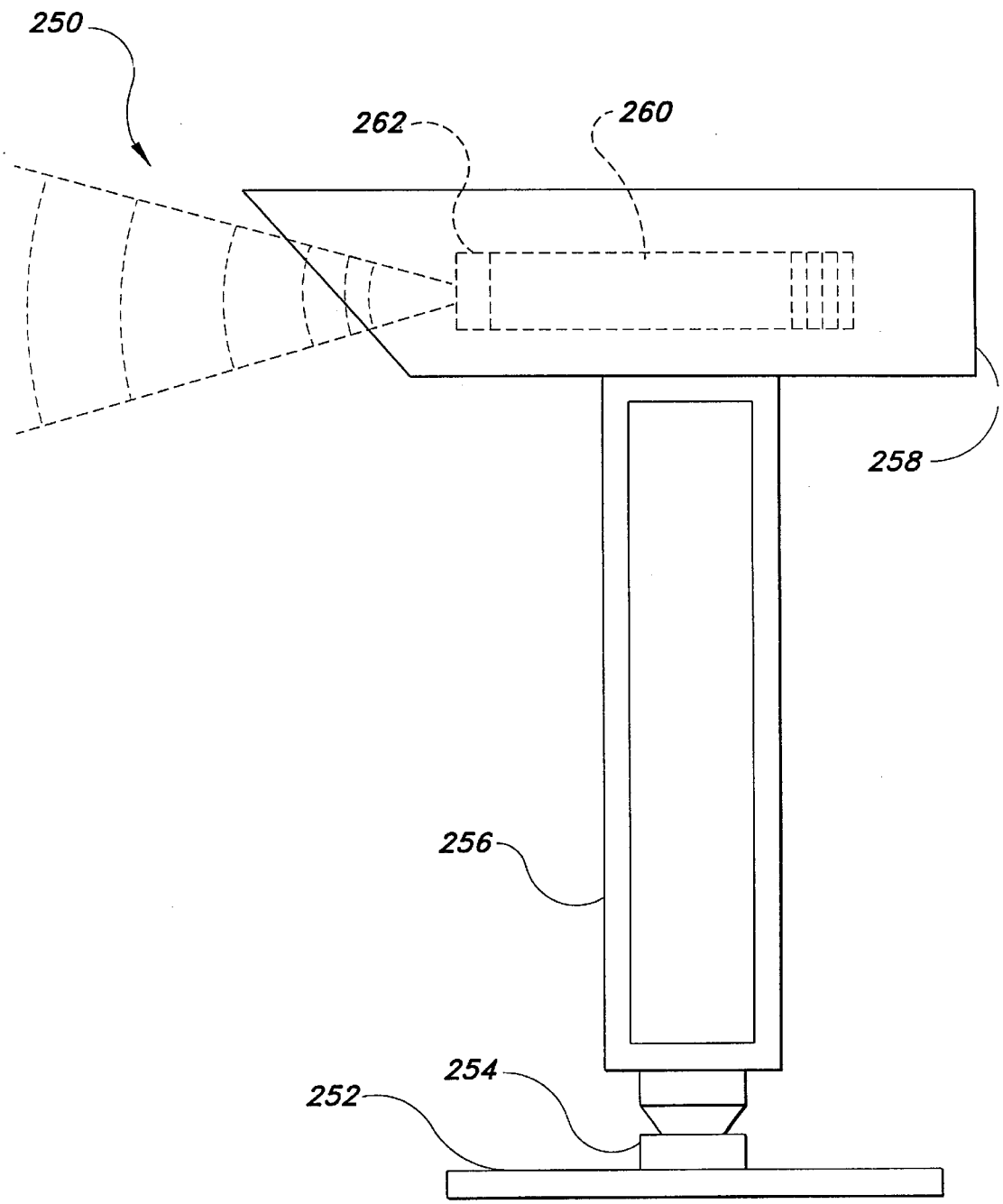
FIG. 17 is a side view of a laser lighting post according the invention.

FIG. 17 shows another laser lighting post 250 according to the invention for providing radiation along a surface. The laser lighting post 250 includes one laser 260 for producing a beam of coherent visible or reflective radiation and a glass plano-convex cylindrical lens 262 which has an aspherical convex cylindrical surface for generating a laser line which is uniformally illuminated from end to end. The laser lighting post 250 also includes a mounting column 256 which including an access door for providing access to a tilt switch assembly and an AC/DC power adapter unit. The mounting column 256 is attached to a base plate 252 by a frangible coupling 254.

It is to be understood that the present invention is not limited to the embodiments described above, but encompasses any and all embodiments within the scope of the following claims.

I claim:

1. A laser lighting unit for providing radiation along a surface comprising:
   a case having a front end and a rear end;
   a flashlight assembly supported in said case, said flashlight assembly including a light bulb and a reflector, said flashlight assembly being oriented to produce a light beam which exits said front end of said case when said light bulb is energized;

a laser assembly supported in said case, said laser assembly including at least one laser and a glass plano-convex cylindrical lens which has an aspherical cylindrical surface, said laser assembly being oriented to produce a laser beam which exits said rear end of said case when said at least one laser is energized, said laser beam being uniformally illuminated from end to end;

a battery power source for powering said light bulb and said at least one laser;

laser switch means for selectively energizing said at least one laser via said battery power source; and, light bulb switch means for selectively energizing said light bulb via said battery power source.

2. A laser lighting unit according to claim 1, wherein said case has an enlarged end to form a head having a front opening which is spanned by a parent lens.

3. a laser lighting unit according to claim 1, further comprising a parabolic reflector.

4. A laser lighting unit according to claim 1, further comprising two lasers which each include a glass plano-convex cylindrical lens which has an aspherical convex cylindrical surface for generating a laser line which is uniformally illuminated from end to end.

5. A laser lighting unit according to claim 1, wherein said battery power source is a single battery.

6. A laser lighting unit according to claim 1, wherein said battery power source is a plurality of batteries in series relation.

7. A laser lighting unit according to claim 1, wherein said battery power source is an interchangeable rechargeable battery pack.

8. A laser lighting post according to claim 1, wherein said radiation is in a range of about 400 to 700 nanometers.

9. The laser lighting post according to claim 1, wherein said radiation is in a range of about 488 to 670 nanometers.

* * * * *